United States Patent
Frei et al.

(10) Patent No.: US 7,169,252 B2
(45) Date of Patent: Jan. 30, 2007

(54) METHOD FOR THE ASSEMBLY OF LIGHT INTEGRATORS

(75) Inventors: Bertram Frei, Nueziders (AT); Norman Korner, Triesen (LI); Ralph Scholl, Grafenau (DE)

(73) Assignee: OC Oerlikon Balzers AG, Balzers (LI)

( * ) Notice: Subject to any disclaimer, the term of this patent is extended or adjusted under 35 U.S.C. 154(b) by 0 days.

(21) Appl. No.: 10/887,052

(22) Filed: Jul. 8, 2004

(65) Prior Publication Data

US 2005/0006025 A1 Jan. 13, 2005

Related U.S. Application Data

(60) Provisional application No. 60/486,521, filed on Jul. 11, 2003.

(51) Int. Cl.
*C09J 5/04* (2006.01)
(52) U.S. Cl. .................. 156/314; 385/133; 385/146; 269/37; 269/41; 359/894
(58) Field of Classification Search ............. 156/314, 156/91, 304.5, 304.1, 292; 385/146, 133; 269/37, 41; 359/894
See application file for complete search history.

(56) References Cited

U.S. PATENT DOCUMENTS

| | | | |
|---|---|---|---|
| 4,740,276 A | 4/1988 | Marmo et al. | |
| 6,149,856 A | 11/2000 | Zemel et al. | |
| 6,594,424 B2 * | 7/2003 | Schmidt et al. | 385/46 |
| 6,625,380 B2 * | 9/2003 | Wagner | 385/146 |
| 6,771,870 B2 * | 8/2004 | Strobl et al. | 385/133 |
| 6,773,118 B2 * | 8/2004 | Lee | 353/122 |
| 2004/0001251 A1 | 1/2004 | Huang | |

FOREIGN PATENT DOCUMENTS

| | | |
|---|---|---|
| DE | 202 17 720 U1 | 11/2002 |
| TW | 523120 | 3/2003 |
| WO | 01/14923 A1 | 8/2000 |

* cited by examiner

*Primary Examiner*—Richard Crispino
*Assistant Examiner*—Christopher Schatz
(74) *Attorney, Agent, or Firm*—Pearne & Gordon LLP

(57) ABSTRACT

A method of assembling a light handling device that includes a plurality of separate walls for reflecting and that is tolerant of elevated heat and heating cycles. The method provides a fast-set adhesive to portions of the walls that are to be secured together. The method also secures the walls in a temporary fixation device for a time period needed for the fast-set adhesive to set, and removes the walls from the temporary fixation device subsequent to the setting of the fast-set adhesive such that the walls are secured together by the fast-set adhesive. The method also provides another means of securing the walls together that is resistant to degradation caused by elevated heat and heating cycles.

6 Claims, 3 Drawing Sheets

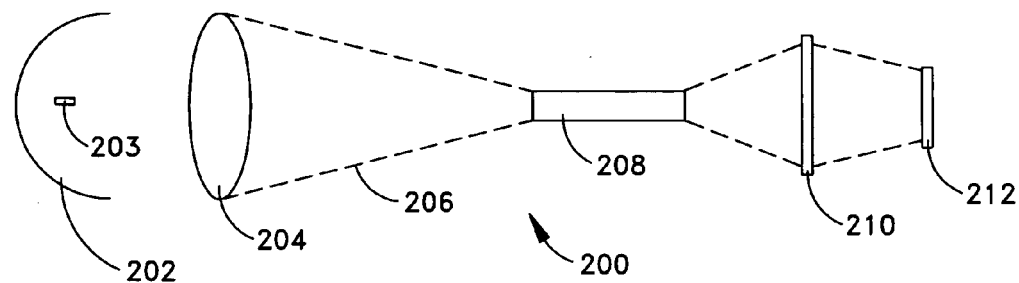
Fig.1
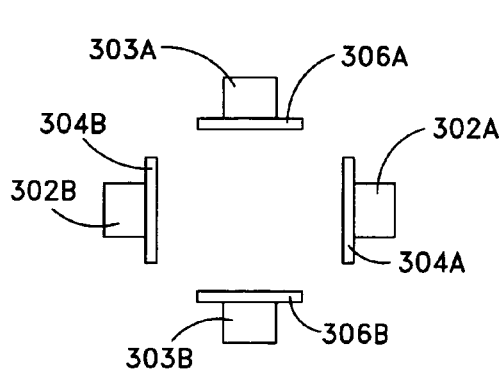
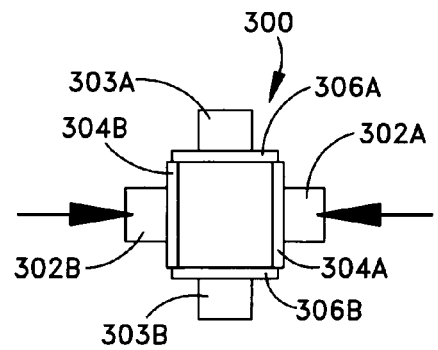
Fig.2A    Fig.2B
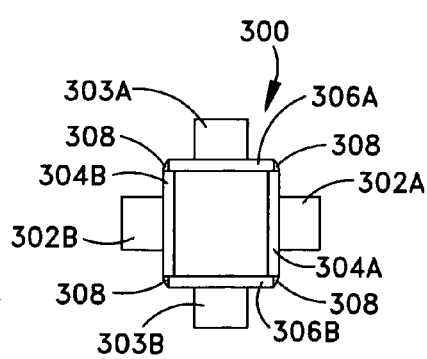
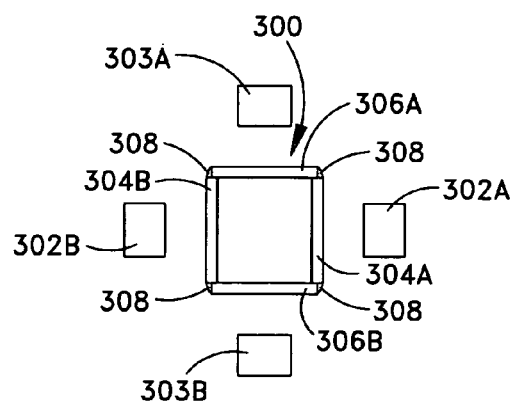
Fig.2C    Fig.2D

METHOD FOR THE ASSEMBLY OF LIGHT INTEGRATORS

TECHNICAL FIELD

The present invention relates to methods of assembling light handling devices, specifically light integrators that include a plurality of separate substrate walls.

BACKGROUND OF THE INVENTION

A typical light integrator includes reflective walls that transmit light in a hollow area of the tunnel via multiple reflections to the output. A homogeneous light distribution is achieved at the output because of the multiple reflections. In particular, the separate walls are assembled together in such a way that a tunnel is formed. The walls can be reflective before being assembled or can be made reflective after the assembly step. Such a light integrator can be used in a light engine for an image projection apparatus. One important parameter of such a light engine is the brightness of the projector. In order to realize bright images strong light sources need to be used. The sources itself as well as the elements in the optical path need to be able to withstand high intensities without being destroyed. Especially the light integrator needs to be able to withstand high amount of light intensity because all of the illumination light needs to transmit through the light integrator and the cross-section of such a light integrator is relative small. Even a small amount of absorption within the light integrator, which normally cannot be avoided, leads to high temperatures. Temperatures equal to or higher than 150° C. can be reached in such applications. Therefore, the light integrator has to be temperature resistant.

A known method for producing such an optical element is to glue the separate planar substrate walls together at the non-optically active surfaces. Typically a UV curing adhesive is used, since this is a fast setting/curing adhesive and therefore allows an easy and inexpensive manufacturing process. In order to perform the assembly, the separate substrate walls are mechanically fixed and the adhesive is applied at the surfaces of the substrates that are not relevant for the optical performance. The mechanical fixation during the gluing guarantees that the relative positions of the substrates are maintained during the complete curing process. After the curing process, when the mechanical strength of the adhesive connection is sufficient in order to stabilize the light integrator, the mechanical fixation is released. If a UV curing adhesive is used, the necessary mechanical strength of the light integrator is reached in a very short time. Typical curing times for commercial available UV curing adhesives are in the range of 5 seconds to 60 seconds. Unfortunately, assemblies based on UV curing adhesives are not temperature resistant for the light intensities as they are more and more used today in image projection systems and therefore they cannot be used for these applications.

In order to realize more temperature resistant assemblies, other types than UV curing adhesives can be used, such as one or two component epoxies, silicone based adhesives, ceramic epoxies, and inorganic adhesives (cements). Of particular interest are ceramic epoxies and inorganic adhesives despite there brittleness. The brittleness of these adhesives gives the impression that they are not suitable for high temperature applications where also severe temperature cycles can occur. However, the coefficient of thermal expansion (CTE) matches closely the CTE of the substrates typically used for light integrators. They provide in general a temperature stable connection between the single substrates. Typical curing schemes for above-mentioned adhesives are exposure to high temperature, humidity or chemical reaction, or initiated by mixing of two components. Unfortunately the curing time of such adhesives is quite long and the time the assembly needs to stay in the mechanical fixation for stabilization increases dramatically. Typical curing times for the above mentioned adhesives are in the range from 1 hour to 24 hours. From a manufacturing point of view such a production method is therefore very expensive and not interesting.

Another approach to realize high temperature resistant optical assemblies is described in WO 01/14923 A1. In this approach a shrink tube is used to fix the single substrates mechanically. Another possibility would be to use one or several adhesive bands wrapped around the assembly, as described in DE 202 17 720. Unfortunately for this method in order to prevent the assembly from collapsing a special shape of the edges of the single substrates is required. Because of this special shape, the integrator cannot collapse and the single substrates are pressed together with a shrinkable tube. It is clear that such a solution has the disadvantage that the mechanical treatment of the edges is difficult and expensive.

Starting from the disadvantages of the methods of the prior art it is the goal of the present invention to provide a possibility to realize temperature stable assemblies not comprising the disadvantages of the prior art such as difficult and/or expensive production processes not suitable for cost efficient mass production.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In accordance with one aspect, the present invention provides a two-step manufacturing process. In a first step, which is a fast fixation step, the assembly is fixed with a fast set or curable adhesive, for example according to the typical and most usual assembly procedure as described before. After the fast fixation/curing step, the assembly is now stable in shape and can be removed from the mechanical fixation within a short time limit. In a second step, which is a reinforcement step, a fixation with increased temperature durability is applied. Here we focus on reinforcement with respect to temperature durability, however the same two-step approach can be used if durability with respect to increased mechanical and/or chemical and/or environmental durability is required. Since the shape of the assembly is already fixed because of the fast fixation step, the assembly can be removed from the mechanical fixation and no special means have to be provided in order to prevent the assembly from collapsing during the second, reinforcement step.

In accordance with another aspect, the present invention provides a method of assembling a light-handling device that includes a plurality of separate walls for reflecting and that is tolerant of elevated heat and heating cycles. The method includes providing a fast-set adhesive to portions of the walls that are to be secured together. The walls are secured in a temporary fixation device for a time period needed for the fast-set adhesive to set. The walls are removed from the temporary fixation device subsequent to the setting of the fast-set adhesive such that the walls are secured together by the fast-set adhesive. The method includes providing another means of securing the walls together that is resistant to degradation caused by elevated heat and heating cycles.

BRIEF DESCRIPTION OF THE DRAWINGS

The foregoing and other features and advantages of the present invention will become apparent from the following description with reference to the accompanying drawings, in which:

FIG. 1 is a schematic side view illustration of an example light engine or image projector that includes a light integrator that can be assembled in accordance with the present invention;

FIGS. 2A–2D are schematic end face illustrations that show steps of assembly of a light integrator, in accordance with embodiment of the present invention;

DESCRIPTION OF EXAMPLE EMBODIMENTS

Figure 3:
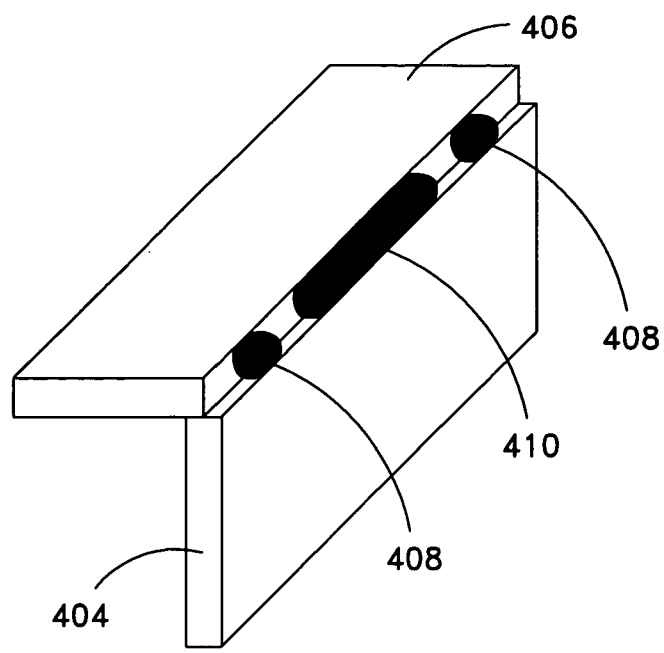
FIG. 3 is a schematic perspective illustration showing two different adhesives applied to two walls of a light integrator to secure the walls in accordance with one aspect of the present invention.

FIG. 1 shows a typical use of a light integrator 208 in an image apparatus 200. In one specific example, the image apparatus 200 is a light engine or image projector. It is to be appreciated that the present invention may be utilized to provide the light integrator 208.

Although the present invention can be utilized to provide the light integrator 208, it should be appreciated that the shown examples of the light integrator 208 and the image apparatus 200 are not limitations on the present invention. It should be understood that the present invention could be utilized to provide other light integrators that are otherwise used. For example, any suitable size, shape, or type of elements or materials could be used in conjunction with the present invention.

Turning back to the shown example, the light integrator 208 receives light from a light source 203. The light emitted by the source 203 is collected by a reflector 202 and focused (i.e., focused light 206) into the entrance of the light integrator 208. In the shown example, a lens 204 provides for the focusing of the light from the source 203 into the light integrator 208. The goal of the reflector 202 and the lens 204 is to focus all light emitted by the source 203 into the entrance of the light integrator 208. Very high energy densities occur within the light integrator 208 because of the concentration of the focused light 206 within the small cross-section of the light integrator 208. It is to be noted that a high energy density is associated with a high temperature.

During passage through the light integrator 208, the light rays undergo multiple reflections, which cause a homogeneous light distribution at the exit of the light integrator 208. The homogeneous light at this exit is imaged onto a light valve 212 by means of a relay optic 210. At the light valve 212 the light is modulated according to the image information. This modulation can be angular modulation if for example DMD panels are used, or polarization modulation if for example LCD based light valves are used. This modulation is translated into an intensity modulation by either the relay optic 210 and/or additional relay optics (not shown). In order to produce an image, the surface of the light valve 212 is often imaged onto a screen with the help of projection optics (the screen and projection optics are not shown). For some applications, a color-sequential method that employs only one light valve is used. In this case a color wheel and/or an optical switch is positioned in the light path somewhere between the light source 203 and the light valve 212. In other applications, two or more light valves are used and the light is split into a corresponding number of color channels.

A major performance criterion of the image apparatus is the brightness of the projected image. To increase the brightness, the power of the light source 203 is correspondingly increased. This leads to higher light densities and therefore higher temperatures in the light integrator 208. This requires assembly methods of the light integrator 208 that can withstand permanently high temperatures and temperature cycles.

FIGS. 2A–2D show steps of a first example embodiment of an assembly method for producing a light integrator 300. In short summary, FIGS. 2A–2D show steps of a method that includes (a) arrangement of substrate walls into jigs, (b) positioning according to desired shape, (c) application of glue, and (d) removing from the mechanical frame.

As shown in FIG. 2A, highly reflective separate substrate walls 304A, 304B, 306A, and 306B are placed and aligned into mechanical jigs 302A, 302B, 303A, and 303B. In one example, the walls have a reflective coating on an inwardly directed side. Within the shown example, each wall (e.g., 304A) within each opposed pair of walls (e.g., 304A and 304B) is similar to the opposed wall with regard to engagement with the other pair of walls (e.g., 306A and 306B).

The walls 304A, 304B, 306A, and 306B are held in place on the jigs 02A, 302B, 303A, and 303B, respectively, with the aid of vacuum. With the jigs 302A, 302B, 303A, and 303B engaging only the outer side of the walls 304A, 304B, 306A, and 306B, damage to the reflective coating on the inwardly directed side is prevented. The next step is to move the jigs 302A, 302B, 303A, and 303B inwards such that the walls 306A and 306B press against the walls 304 and 304B (see FIG. 2B). The jigs 302A, 302B, 303A, and 303B move the sidewalls into place in such a way that the requested dimensions of the finished light integrator 300 are obtained. To achieve the required tolerances of typically 0.1 mm or less, the jigs 302A, 302B, 303A, and 303B have to be very precise. This applies as well to the mechanism (not shown), which moves the jigs 302A, 302B, 303A, and 303B. Such a precise mechanism is very expensive and therefore short cycle times are desirable.

With the walls 304A, 304B, 306A, and 306B in their final positions (as shown in FIG. 2B), the walls have to be kept in this position during application of a fast-set adhesive 308 (FIG. 2C). It is to be appreciated that any suitable fast-set adhesive 308 may be used. Within this step of the shown example, the fast-set adhesive 308 is applied with the aid of dispensers (not shown) and is applied along the intersection edges of the walls 304A, 304B, 306A, and 306B (i.e., exterior corners of the light integrator 300 being produced).

After application, the fast-set adhesive 308 must be allowed to set (e.g., cured to the point of retention). In the case of a UV curing adhesive, the adhesive 308 is exposed to intensive UV light for a sufficient time (e.g., 5 to 60 seconds). The set or cured adhesive 308 now maintains the structure of the light integrator 300 and the jigs 302A, 302B, 303A, and 303B are released (see FIG. 2D). The final-form light integrator 300 is removed out of the jigs 302A, 302B, 303A, and 303B and passed forward for further processing. The jigs 302A, 302B, 303A, and 303B are now ready to process the next light integrator.

It is to be appreciated that the fast-set adhesive 308 is selected for the feature of having a fast set time. Other characteristics of the fast-set adhesive, such as heat resistively, may be of secondary consideration as will be understood upon further appreciation of the remaining steps of the present invention. Specifically, according to the present invention, after the steps of fixing the walls 304A, 304B, 306A, and 306B in place with a fast-set adhesive, as shown in FIGS. 2A–2D, a second step is performed which is a reinforcement step.

In a first embodiment, the reinforcement step includes the application of a second adhesive 410 that ensures, for example, the durability in high temperature environments. The use of the second adhesive 410 is shown in the example of FIG. 3. Only two intersecting walls 404 and 406 (e.g., forming one corner of a light integrator) are shown. The walls 404 and 406 correspond to any of the intersecting pairs of walls (e.g., 304A and 306A) discussed with regard to the steps shown in FIGS. 2A–2D. However, it is to be appreciated that the other intersections of walls of the light integrator will be similarly adhered. FIG. 3 shows a fast-set adhesive 408 (which corresponds to the fast-set adhesive 308 shown within FIGS. 2A–2D) and the second, reinforcing adhesive 410. The setting or curing time of the second, reinforcing adhesive 410 is not critical since no expensive jigs are required to maintain the final shape of the light integrator. Therefore, the second, reinforcing adhesive 410 may have a setting or curing time in the range of 1 minute to 24 hours.

With regard to adhesives, one or two component epoxies, silicone based adhesives, ceramic epoxies, and inorganic adhesives (cements) have relatively good performance in applications where parts are exposed to high temperatures and/or temperature cycles as compared to UV curing adhesives. Because of the pre-fixing by the fast-set adhesive (e.g., a UV curable adhesive), the edges of the walls need not to be shaped in a special form to prevent the light integrator from collapsing during curing. If a planar edge surface is preferred, the edge should have a final roughness in order to increase the bonding ability of the applied adhesive(s).

There are different possibilities of geometrical shapes for the applied adhesives. For example, the fast-set adhesive 408 for fixation can be provided as glue spots. Within a further example, the glue spots can be applied in the middle of the light integrator or toward both ends. The second, reinforcing adhesive 410 can be applied between the glue spots or along the whole edge of the light integrator. Within another example, the fast-set (fixation) adhesive can also be applied over the whole length of the light integrator and the second, reinforcing (temperature durable) adhesive is applied on top of the fast-set adhesive. Various other schemes for the application of a fast-set adhesive and a second, reinforcing adhesive are contemplated.

In addition to the procedure described above there are different methods of the second step, which provides another means of securing the walls together that is resistant to degradation caused by elevated heat and heating cycles. For example, the second, reinforcing (temperature durable) adhesive can be applied while the light integrator is still in the jig. The setting or curing for the reinforcing, durable adhesive may be done after the light integrator is removed from the jig. It is also conceivable to apply the fixation adhesive, and before curing it, to apply the reinforcing, durable adhesive. After both adhesives are applied, a pre-curing is done with the light integrator held in the jig and the curing for the reinforcement adhesive is finished upon removal of the light integrator from the jig. A preferred method is to apply both the fixation adhesive and the reinforcing, durable adhesive simultaneously with a dispensing aid, which ensures that both adhesives get in contact with the planar faces of the walls to be joined. It may be required that such a dispensing aid be configured and used such that mixing of the two adhesives is avoided.

Figure 4:
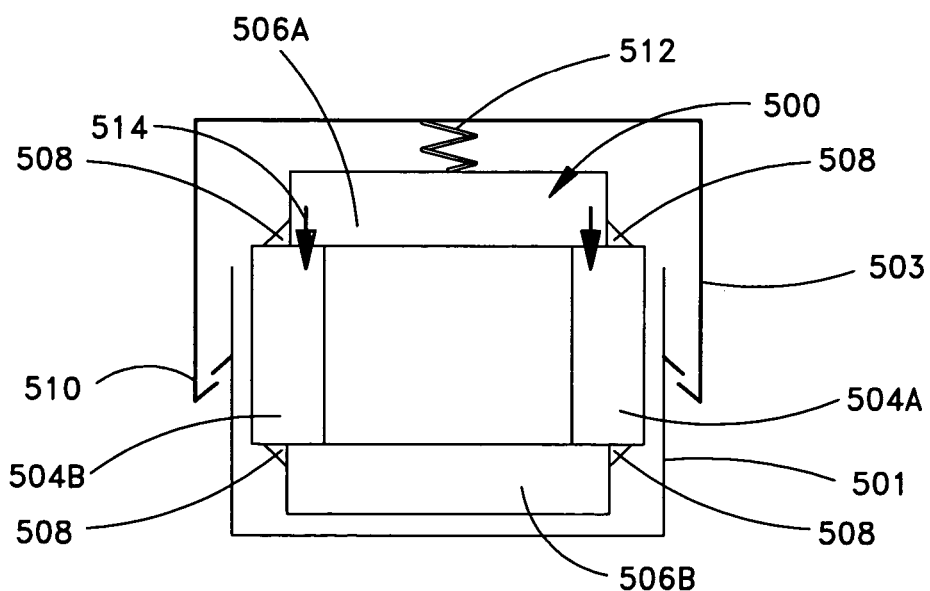
FIG. 4 is a schematic end face illustration of a light integrator with a first adhesive and a first mechanical device, which includes a bracket and a biasing spring, for securing the walls in accordance with another aspect of the present invention.

In another embodiment of the present invention, the second, reinforcing step, which provides another means of securing the walls together that is resistant to degradation caused by elevated heat and heating cycles, includes the use of a bracket on the outside of a light integrator 500. One specific example of such a bracket is shown in FIG. 4. It is to be noted that walls 504A, 504B, 506A, and 506B generally correspond to the walls 304A, 304B, 306A, and 306B of the light integrator provided by the steps shown within FIGS. 2A–2D. In this embodiment of FIG. 4, the light integrator 500 is arranged within a first or lower, U-shaped tube 501 of the bracket. Additionally, a second U-shaped tube 503 of the bracket is put on top of the light integrator 500. The second U-shaped tube 503 is fixed to the first U-shaped tube 501 with a spring-loaded retaining mechanism 510 and 512 associated with the bracket. In the shown example, the spring-loaded retaining mechanism includes a retainer 510 and a spring 512. The spring-loaded mechanism is preferably applied in such a way that in the light integrator 500 no force is applied to a fast-set adhesive 508 (which corresponds to the fast-set adhesive 308 shown within FIGS. 2A–2D). The force from the spring-loaded mechanism 510, 512 is distributed in the light integrator 500 like in a force fit. Force 514 from one pair of walls 506A and 506B is transferred directly to the other pair of walls 504A and 504B. In such a configuration, the light integrator 500 cannot collapse when the force from the spring-loaded mechanism 510, 512 exceeds the strength of the fast-set adhesive 508. Therefore, no special treatment of the edges is necessary and no force is applied to the prefixing adhesive.

There are different possibilities for the layout of such a bracket and spring loaded mechanism. For example, the light integrator could be glued in the bracket with a temperature-curable adhesive, a high temperature resistant silicone or an organic adhesive. The bracket could cover a whole single substrate wall or only part of it, such as for example only the front and end of the light integrator. If this is the case, the bracket, together with the spring loaded mechanism could additionally provide aperture shields for preventing the light to enter the substrate walls themselves and protect the mirror coating. On the other hand it would be sufficient if the bracket only is in the middle of the light integrator.

The stability of the light integrator can be further improved by shaping in addition the edges of the walls. Such shaping as for example forming steps in at least some of the edges can provide by itself mechanical stability to the light tunnel geometry. With the fast fixation step this stability can be fixed and the light integrator can be easily handled. With the reinforcement step, the light integrator becomes temperature stable.

Figure 5:
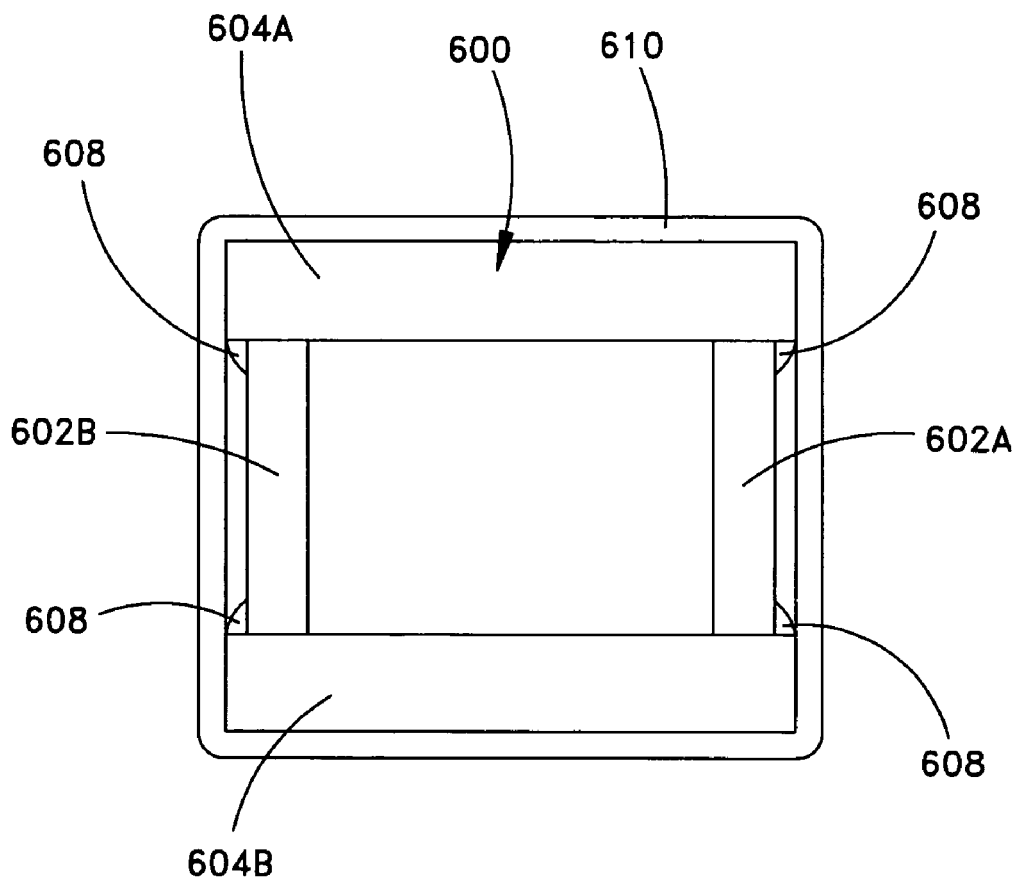
FIG. 5 is a schematic end face illustration of a light integrator with a first adhesive and a second mechanical device, which includes a shrink tube, for securing the walls in accordance with another aspect of the present invention.

In another embodiment of the present invention, the second, reinforcing step, which provides another means of securing the walls together that is resistant to degradation caused by elevated heat and heating cycles, includes the use of a shrink tube. One specific example is shown in FIG. 5. A light integrator 600 has a first pair of substrate walls 602A and 602B and a second pair of substrate walls 604A and 604B (generally corresponding to the walls 304A, 304B, 306A, and 306B of the light integrator provided by the steps shown within FIGS. 2A–2D). The walls 602A, 602B, 604A, and 604B are assembled in such a way that they form a hollow rectangle. A fast-set UV curing adhesive 608 (which corresponds to the fast-set adhesive 308 shown within FIGS. 2A–2D) is applied at the outer edges of the contact lines of the walls 602A, 602B, 604A, and 604B. As such, the light integrator 600 is stabilized, at least for low temperature situations. In order to increase the high temperature durability a shrink tube 610 is applied to the light integrator 600 and is shrunk into form-fitting arrangement around the light integrator 600. This represents a reinforcement fixation according to the present invention.

In one specific example, the walls 602A, 602B, 604A, and 604B are assembled in such a way that the outer surfaces of the walls 602A and 602B are within the rectangle described by the outer surfaces of the walls 604A and 604B. With such an arrangement, no force is directly applied by the shrink tube 610 to the walls 602A and 602B and as a consequence no force is applied to the fast-set adhesive 608.

The examples presented above mainly focus on rectangular-shaped light integrators. However it should be noted that the scope of the present invention is by no means restricted to this application. The same basic ideas could be applied for example to light integrators which do not have a rectangular shape. All kinds of geometries such as a trapezoidal shape or the shape of a parallelepiped could be used. In addition, the light integrators could have a tapered form.

More generally, the present invention is not restricted to light integrators. This invention could be useful for any optical assembly comprising a number of substrate walls to be assembled where a fast preassembly is required and a second reinforcement fixation is needed.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed:

1. A method of assembling a light handling device that includes a plurality of separate walls for reflecting and that is tolerant of elevated heat and heating cycles, the method including:
   providing a fast-set adhesive to portions of the walls that are to be secured together;
   securing the walls in a temporary fixation device for a time period needed for the fast-set adhesive to set;
   removing the walls from the temporary fixation device subsequent to the setting of the fast-set adhesive such that the walls are secured together by the fast-set adhesive; and
   providing another means of securing the walls together that is resistant to degradation caused by elevated heat and heating cycles;
   wherein the step of providing another means of securing includes providing a slow-set adhesive that is resistant to elevated heat and heat cycles to the portions of the walls that are to be secured together.

2. A method as set forth in claim 1, wherein the step of providing a slow-set adhesive includes providing the slow-set adhesive prior to the step of removing the walls from the temporary fixation device.

3. A method of assembling a light handling device that includes a plurality of separate walls for reflecting and that is tolerant of elevated heat and heating cycles, the method including:
   providing a fast-set adhesive to portions of the walls that are to be secured together;
   securing the walls in a temporary fixation device for a time period needed for the fast-set adhesive to set;
   removing the walls from the temporary fixation device subsequent to the setting of the fast-set adhesive such that the walls are secured together by the fast-set adhesive; and
   providing another means of securing the walls together that is resistant to degradation caused by elevated heat and heating cycles;
   wherein the step of providing another means of securing includes providing a mechanical device that engages the walls and provides a force to retain the walls in place and the step of providing a mechanical device includes providing the mechanical device with a biasing spring.

4. A method of assembling a light handling device that includes a plurality of separate walls for reflecting and that is tolerant of elevated heat and heating cycles, the method including:
   providing a fast-set adhesive to portions of the walls that are to be secured together;
   securing the walls in a temporary fixation device for a time period needed for the fast-set adhesive to set;
   removing the walls from the temporary fixation device subsequent to the setting of the fast-set adhesive such that the walls are secured together by the fast-set adhesive; and
   providing another means of securing the walls together that is resistant to degradation caused by elevated heat and heating cycles;
   wherein the step of providing another means of securing includes providing a mechanical device that engages the walls and provides a force to retain the walls in place and the step of providing a mechanical device includes providing the mechanical device with a bracket and a spring that biases the walls into engagement with the bracket.

5. A method of assembling a light handling device that includes a plurality of separate walls for reflecting and that is tolerant of elevated heat and heating cycles, the method including:
   providing a fast-set adhesive to portions of the walls that are to be secured together;
   securing the walls in a temporary fixation device for a time period needed for the fast-set adhesive to set;
   removing the walls from the temporary fixation device subsequent to the setting of the fast-set adhesive such that the walls are secured together by the fast-set adhesive; and
   providing another means of securing the walls together that is resistant to degradation caused by elevated heat and heating cycles;

wherein the step of providing another means of securing includes providing a mechanical device that engages the walls and provides a force to retain the walls in place and the step of providing a mechanical device includes providing the mechanical device as a shrink tube extending around the walls.

6. A method of assembling a light handling device that includes a plurality of separate walls for reflecting and that is tolerant of elevated heat and heating cycles, the method including:

providing a fast-set adhesive to portions of the walls that are to be secured together;

securing the walls in a temporary fixation device for a time period needed for the fast-set adhesive to set;

removing the walls from the temporary fixation device subsequent to the setting of the fast-set adhesive such that the walls are secured together by the fast-set adhesive; and providing another means of securing the walls together that is resistant to degradation caused by elevated heat and heating cycles;

wherein the step of providing a fast-set adhesive occurs concurrent with the step of providing a slow-set adhesive.

* * * * *